US008638477B2

(12) United States Patent
Ikari

(10) Patent No.: US 8,638,477 B2
(45) Date of Patent: Jan. 28, 2014

(54) IMAGE PROCESSING APPARATUS, CONTROL METHOD OF IMAGE PROCESSING APPARATUS AND PROGRAM

(75) Inventor: Daiki Ikari, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 13/277,107

(22) Filed: Oct. 19, 2011

(65) Prior Publication Data

US 2012/0105921 A1    May 3, 2012

(30) Foreign Application Priority Data

Oct. 29, 2010   (JP) ................................ 2010-244364

(51) Int. Cl.
    *H04N 1/04*           (2006.01)
(52) U.S. Cl.
    USPC ........................... 358/474; 358/448; 358/488
(58) Field of Classification Search
    USPC ........ 358/474, 488, 448, 498, 497, 496, 1.14, 358/1.15, 406, 426.05, 437, 461
    See application file for complete search history.

(56) References Cited

U.S. PATENT DOCUMENTS

| | | | | |
|---|---|---|---|---|
| 4,922,290 A | * | 5/1990 | Yoshitake et al. | 355/53 |
| 5,592,207 A | * | 1/1997 | Kobayashi et al. | 347/129 |
| 6,081,615 A | * | 6/2000 | Yasui | 382/162 |
| 7,348,978 B2 | * | 3/2008 | Nagata et al. | 345/427 |
| 7,916,969 B2 | * | 3/2011 | Rai | 382/275 |
| 8,351,826 B2 | * | 1/2013 | Mohri | 399/235 |
| 8,502,903 B2 | * | 8/2013 | Kashitani | 348/333.02 |
| 8,503,786 B2 | * | 8/2013 | Sata et al. | 382/181 |
| 2002/0196476 A1 | * | 12/2002 | Ozaki | 358/406 |
| 2007/0189791 A1 | * | 8/2007 | Mohri | 399/50 |

FOREIGN PATENT DOCUMENTS

JP    2002-185725 A    6/2002

* cited by examiner

*Primary Examiner* — Negussie Worku
(74) *Attorney, Agent, or Firm* — Canon U.S.A., Inc., IP Division

(57) ABSTRACT

An image processing apparatus includes a storage unit, a conveyance unit configured to convey a document, a reading unit configured to read an image of the document line by line in a main scanning direction, a check unit configured to check a free space of the storage unit, a detection unit configured to generate detection processing data for determining a position of a portion of the image in the main scanning direction of the reading unit where the image cannot be read correctly and to detect the position using the detection processing data, both in response to the free space of the storage unit being sufficient to store the detection processing data, and a correction unit configured to correct a pixel value of the portion corresponding to the position detected by the detection unit in the image read by the reading unit.

12 Claims, 16 Drawing Sheets

IMAGE PROCESSING APPARATUS, CONTROL METHOD OF IMAGE PROCESSING APPARATUS AND PROGRAM

BACKGROUND OF THE INVENTION

1. Field of the Invention

The present invention relates to an image processing apparatus, a control method of the image processing apparatus, and a program.

2. Description of the Related Art

The reading method for a scanner is divided into a "document fixed reading" method and a "document feeding-reading" method.

The "document fixed reading" method is a reading method in which a document is fixed to the document positioning plate and read by moving a reading unit. The "document feeding-reading" method is a reading method in which a document is fed by an automatic document conveyance and read while the reading unit is fixed.

In the "document feeding-reading" method, if dust (dust, dirt, or stains) is attached to glass in a position where the reading unit is fixed on the document positioning plate, the reading unit continues to read the same dust, which produces a black line in the read image.

FIG. 16 illustrates an image in which a black line appears due to dust when a document is read by a scanner. As illustrated in FIG. 16, the black line appears in a specific position in a main scanning direction with a certain width, which results in a stripe extending in a sub-scanning direction. The image in a black line portion cannot be read accurately in the main scanning direction of the scanner.

A technique for making a black line inconspicuous by detecting dust present in a reading position of a document and performing correction processing on the read image is known as a technique for reducing an appearance of such a black line (Japanese Patent Application Laid-Open No. 2002-185725). According to this technique, dust is detected by reading a white board of an automatic feeding belt of a document and comparing with a threshold a value obtained as a total in the sub-scanning direction of positions in the main scanning direction of black pixels contained in the white board.

In the above technique, a dedicated line memory is needed to store positions in the main scanning direction of black pixels contained in the white board when a dust detection operation is performed.

Thus, to make the dedicated line memory unnecessary, using a region in which no image data is stored of a storage area of a general-purpose image memory allows the region to store positions in the main scanning direction of black pixels contained in the white board can be considered.

However, depending on usage conditions thereof, the image memory may have storage capacity of a region in which no image data is stored of the storage area of the image memory smaller than the capacity of the dedicated line memory. In such a case, a dust detection operation cannot be properly performed by using a region in which no image data is stored of the storage area of the image memory.

SUMMARY OF THE INVENTION

The present invention is directed to properly performing detection processing of a pixel to be corrected contained in image data with use of a region of a storage area of a memory in which no image data is stored.

According to an aspect of the present invention, an image processing apparatus includes a storage unit, a conveyance unit configured to convey a document, a reading unit configured to read an image of the document line by line in a main scanning direction, a check unit configured to check the free space of the storage unit, a detection unit configured to generate detection processing data for determining a position of a portion of the image in the main scanning direction of the reading unit where the image cannot be read correctly and to detect the position using the detection processing data, both in response to the free space of the storage unit being sufficient to store the detection processing data, a correction unit configured to correct a pixel value of the portion corresponding to the position detected by the detection unit in the image read by the reading unit, and a control unit configured to control the detection unit to detect the position in first resolution if the free space checked by the check unit is larger than a predetermined value and control the detection unit to detect the position in second resolution which is lower than the first resolution, if the free space checked by the check unit is smaller than the predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
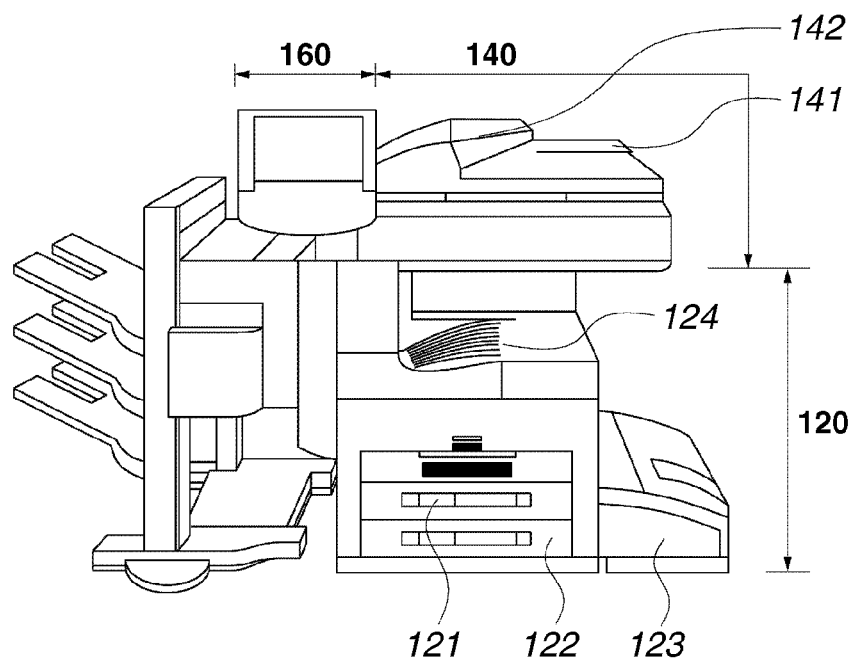
FIG. 1 is an external view of a copying machine according to a first exemplary embodiment.

FIG. 1 is an external view of a copying machine according to a first exemplary embodiment.

A printing unit 120 prints an image on paper based on image data. A printing method in the first exemplary embodiment is an electrophotographic method, but the printing method may be any other printing method.

Paper cassettes 121, 122, 123 store paper before being printed by the printing unit 120. Paper after being printed by the printing unit 120 is discharged to a discharge tray 124.

A scanner unit 140 reads a document to input image data thereof. The document is read by being set to a tray 142 of a document feeder 141. The scanner unit 140 reads the document by feeding a sheet of the document one by one from the tray 142 of the document feeder 141 (hereinafter, this operation mode will be referred to as a document feeding-reading mode). The scanner unit 140 can also read a document by placing the document on document positioning plate described below (hereinafter, this operation mode will be referred to as a document fixed reading mode).

An operation unit 160 receives from a user various operations such as a print instruction of the printing unit 120 and a reading instruction of the scanner unit 140.

Figure 2:
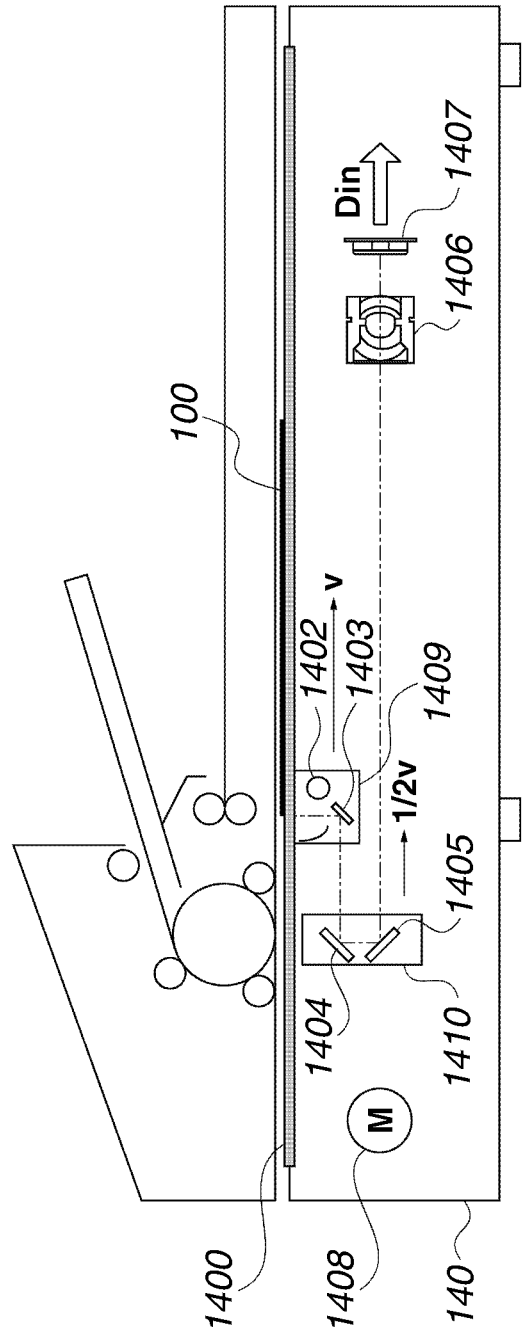
FIG. 2 illustrates a configuration of a scanner unit and an operation in a document fixed reading mode of the scanner unit according to the first exemplary embodiment.

FIG. 2 illustrates the configuration of the scanner unit 140 and an operation in the document fixed reading mode of the scanner unit 140 according to the first exemplary embodiment.

A document 100 is placed on a document positioning plate 1400. The document 100 is irradiated with an illumination lamp 1402, and reflected light therefrom is passes through mirrors 1403, 1404, 1405 to form an image on a charge coupled device (CCD) sensor 1407 by a lens 1406. The reflected light input into the CCD sensor 1407 is converted into an electric signal by the sensor, and the electric signal of a pixel thereof is converted into digital data by an analog-to-digital (A/D) converter (not illustrated) to be input into a controller 200 as a pixel signal Din. A 600-dpi (first resolution) reading mode and a 300-dpi (second resolution) reading mode can be selected by settings for the CCD sensor 1407.

A first mirror unit 1409 includes the illumination lamp 1402 and the mirror 1403, and a second mirror unit 1410 includes the mirrors 1404 and 1405. The first mirror unit 1409 and the second mirror unit 1410 are driven by a motor 1408. The document 100 is scanned in lines with the first mirror unit 1409 moving at a speed v and the second mirror unit 1410 moving at a speed v/2.

Figure 3:
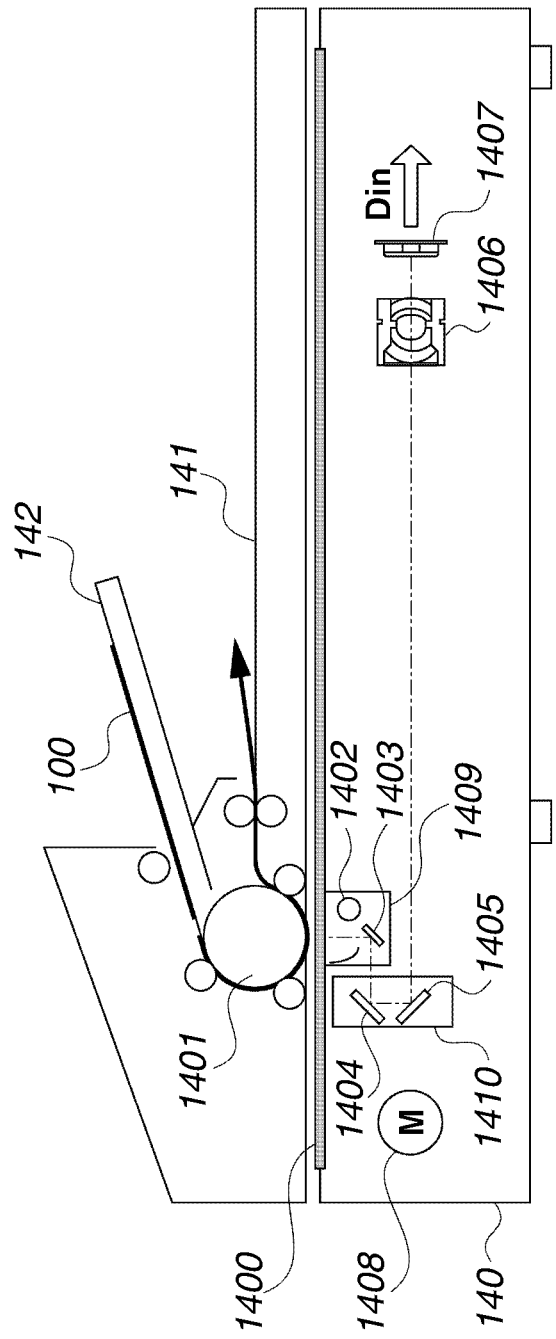
FIG. 3 illustrates the configuration of the scanner unit and the operation in a document feeding-reading mode of the scanner unit according to the first exemplary embodiment.

FIG. 3 illustrates the configuration of the scanner unit 140 and the operation in the document feeding-reading mode of the scanner unit 140 according to the first exemplary embodiment.

In the document feeding-reading mode, the direction in which a document is conveyed corresponds to the sub-scanning direction of reading, and the direction perpendicular to the direction in which the document is conveyed corresponds to the main scanning direction of reading.

The document 100 is placed on the tray 142. The document 100 is conveyed in an arrow direction by passing over the document positioning plate 1400 from the tray 142 by a drive roller 1401 at a constant speed. The document is read on the document positioning plate 1400 in lines as described above with reference to FIG. 2.

In the document feeding-reading mode, a document is read while the first mirror unit 1409 and the second mirror unit 1410 are fixed, instead of being moved. Since, the documents set to the tray 142 are automatically read one after another in the document feeding-reading mode, a large quantity of documents can be read continuously at high speed.

In the document feeding-reading mode, dust, dirt, flaws, stains or the like present in a position where the first mirror unit 1409 is fixed on the document positioning plate 1400 could cause a black line. An image in a black line portion cannot be read accurately in the main scanning direction of the scanner. In the description that follows, a case when dust is the cause of a black line is taken as an example, however the first exemplary embodiment can also be applied when the cause of a black line is other than dust.

Figure 4:
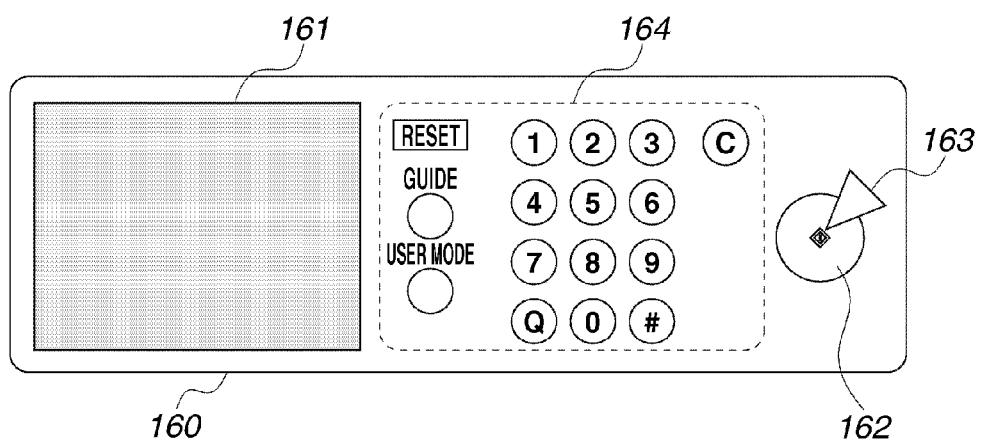
FIG. 4 illustrates a configuration of an operation unit according to the first exemplary embodiment.

FIG. 4 illustrates the configuration of the operation unit 160 according to the first exemplary embodiment.

A liquid crystal operation panel 161 is a combination of a liquid crystal and a touch panel and not only displays an operation screen, but also transmits information about a display key to the controller 200 when the key is pressed by the user.

A start key 162 is used to input instructions to start to read a document or to print an image, or instructions to start other functions. Light-emitting diodes (LEDs) of two colors of green and red are embedded in the start key, and green lighting indicates a state ready for starting and red lighting indicates a state not ready for starting.

A stop key 163 is used to input an instruction to stop an active operation.

A hard key group 164 includes a numeric keypad, a clear key, a reset key, a guide key, and a user mode key.

Figure 5:
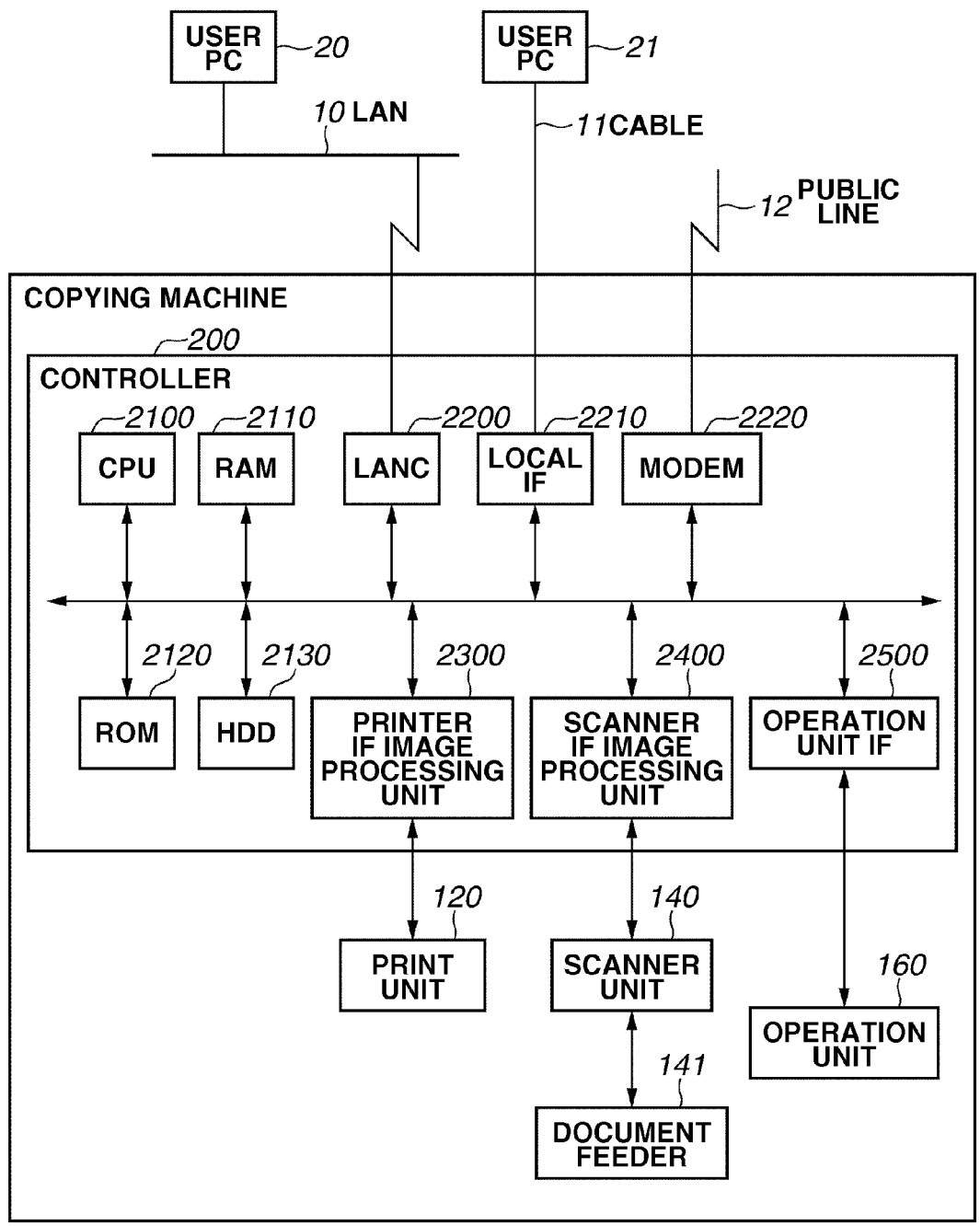
FIG. 5 is a block diagram illustrating the configuration of the copying machine according to the first exemplary embodiment.

FIG. 5 is a block diagram illustrating the configuration of the copying machine according to the first exemplary embodiment.

The controller 200 is connected to a local area network (LAN) 10, a cable 11, a public line 12, the printing unit 120, the scanner unit 140, and the operation unit 160. The controller 200 performs centralized control of the operations of the copying machine and also input/output control of image data and device information.

A central processing unit (CPU) 2100 is a processor to control the entire copying machine and performs centralized control of access to various devices being connected to based on a control program stored in a read only memory (ROM) 2120 or the like. Further, the CPU 2100 performs centralized control of various kinds of processing performed inside the controller 200.

A RAM 2110 is a system work memory and temporarily stores image data, data necessary for dust detection processing described below, and the like.

The ROM 2120 is a boot ROM and stores a boot program of the system.

A hard disk drive (HDD) 2130 mainly stores system software necessary to activate and operate a computer, image data, and the like. The above-described data pieces may be not stored only in the HDD 2130 but also in a storage medium capable of storing data after power-off.

A LAN controller (LANC) 2200 is connected to the LAN 10 to input/output image data for output or information about device control into/from a user personal computer (PC) 20.

A local interface (IF) 2210 is connected to the cable 11 to input/output image data for output or information about device control into/from a user PC 21.

A MODEM 2220 is connected to the public line 12 to input/output image data for output or information about device control.

A printer IF image processing unit 2300 is connected to the printing unit 120 to perform communication with the printing unit 120. The printer IF image processing unit 2300 also performs synchronous/asynchronous conversion of image data and image processing for print output.

A scanner IF image processing unit 2400 is connected to the scanner unit 140 to perform communication with the scanner unit 140. The scanner IF image processing unit 2400 also performs synchronous/asynchronous conversion of image data and image processing such as dust detection processing and dust correction processing described below. Details of the scanner IF image processing unit 2400 will be described below with reference to FIG. 6.

An operation unit IF 2500 is connected to the operation unit 160 to output data to be displayed in the operation unit 160 from the controller 200 to the operation unit 160. The operation unit IF 2500 also inputs information input by the user via the operation unit 160 from the operation unit 160 into the controller 200.

Figure 6:
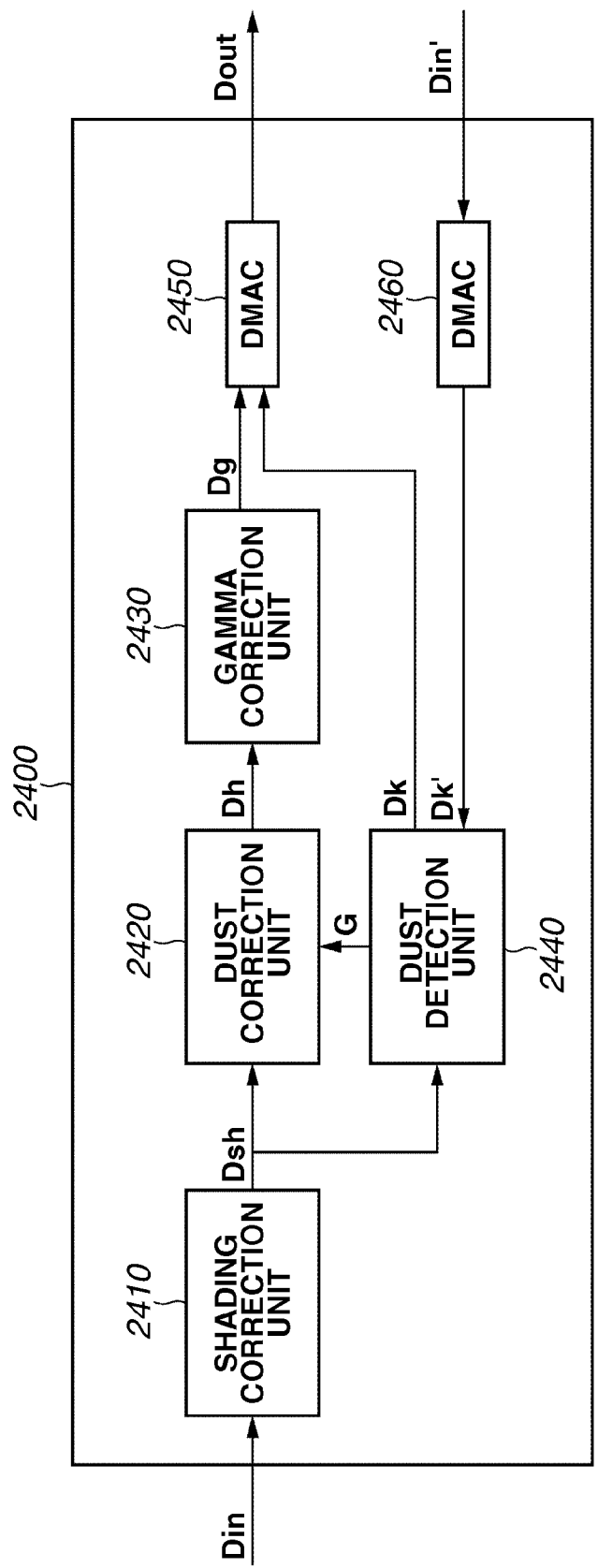
FIG. 6 is a block diagram illustrating a configuration of a scanner interface (IF) image processing unit according to the first exemplary embodiment.

FIG. 6 is a block diagram illustrating the configuration of the scanner IF image processing unit 2400 according to the first exemplary embodiment.

A pixel signal Din (see FIGS. 2 and 3) output by the scanner unit 140 is input into the scanner IF image processing unit 2400.

A shading correction unit 2410 performs correction processing by using a publicly known technology so that brightness unevenness due to properties of an optical system or imaging system is corrected to uniform brightness of an image. A pixel signal Dsh obtained after the correction processing in the shading correction unit 2410 is output to the subsequent stage.

A dust correction unit 2420 acquires position information of dust from a dust detection unit 2440 described below when dust causing a black line is attached to a document reading position. Then, the dust correction unit 2420 performs correction processing to make the black line in a read image caused by dust inconspicuous using the position information of the dust. For example, the dust correction unit 2420 performs correction processing on pixels in the black line (hereinafter, referred to as pixels to be corrected) by performing interpolation or substitution by using normal pixels present around the black line. A pixel signal Dh obtained after the correction processing in the dust correction unit 2420 is output to the subsequent stage.

Figure 8:
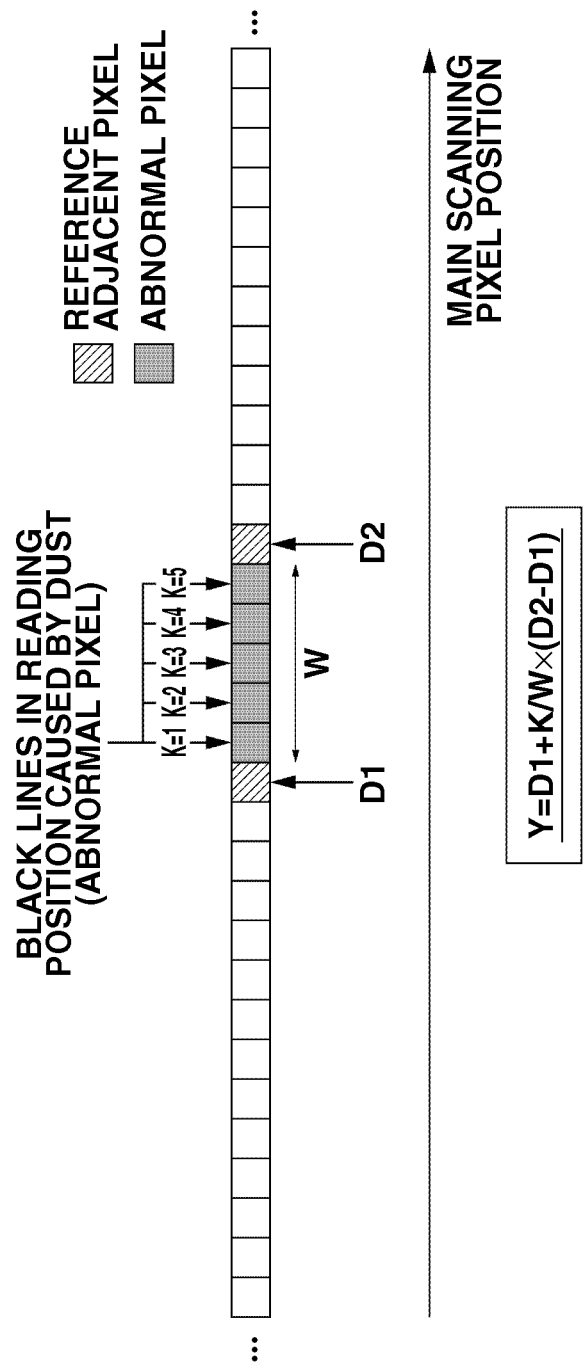
FIG. 8 illustrates details of dust correction processing by a dust correction unit according to the first exemplary embodiment.

FIG. 8 illustrates details of dust correction processing by the dust correction unit 2420 according to the first exemplary embodiment. In FIG. 8, Y denotes correction result pixels, D1 denotes a left edge reference adjacent pixel, D2 denotes a right edge reference adjacent pixel, K denotes a pixel position from a dust correction processing start position, and W denotes a width of pixels to be corrected. When the dust correction processing is performed by linear interpolation, a correction result is calculated by the following formula:

$$Y = D1 + K/W \times (D2 - D1)$$

Alternatively, the dust correction processing may be performed by performing substitution processing simply using normal pixels (reference adjacent pixels) therearound without using any calculation.

A gamma correction unit 2430 corrects differences of color properties between reading elements and the device by using a publicly known technology. A pixel signal Dg obtained after the correction processing performed by the gamma correction unit 2430 is output to the subsequent stage.

The dust detection unit 2440 detects the position of attached dust when the dust causing a black line is attached to a document reading position. Position information G of the detected dust is transmitted to the dust correction unit 2420 and used to determine a correction range (black line portion) when an image with a black line is actually input.

According to the first exemplary embodiment, the dust detection unit 2440 is configured to have no line memory therein and configured to need to exchange data with the image memory (RAM 2110) to detect dust. Thus, the dust detection unit 2440 is configured to be able to output data to be written into the image memory (RAM 2110) to a direct memory access controller (DMAC) 2450 as Dk and to input data to be read from the image memory (RAM 2110) from a DMAC 2460 as Dk'.

The direct memory access controller (DMAC) 2450 directly writes the pixel signal Dg output from the gamma correction unit 2430 or the data Dk output from the dust detection unit 2440 to a specified region of the image memory (RAM 2110) as data Dout without going through the CPU.

The direct memory access controller (DMAC) 2460 directly reads data Din' from the specified region of the image memory (RAM 2110) without going through the CPU to input the data Din' into the dust detection unit 2440.

Figure 7:
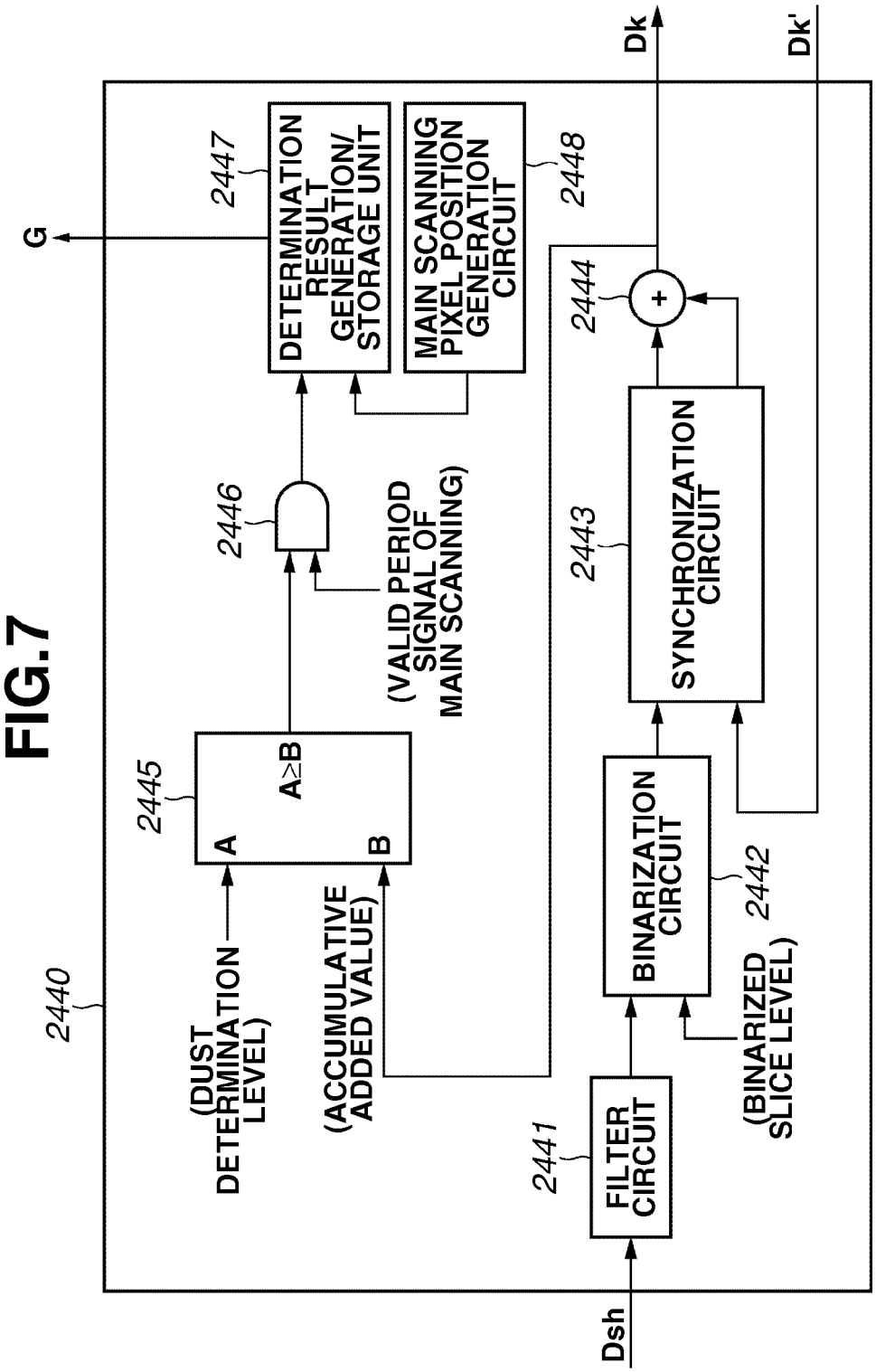
FIG. 7 is a block diagram illustrating a configuration of a dust detection unit according to the first exemplary embodiment.

FIG. 7 is a block diagram illustrating the configuration of the dust detection unit 2440 according to the first exemplary embodiment.

A pixel signal Dsh obtained by reading a white board (reference image) on the drive roller 1401, when a reading job using the document feeder 141 is started or between sheets (between a plurality of documents being read), is input into the dust detection unit 2440.

A filter circuit 2441 performs processing, such as highlighting high-frequency components on the pixel signal Dsh after shading correction, as preprocessing to facilitate detection of an influence of dust.

A binarization circuit 2442 binarizes a pixel signal by comparing it with a predetermined binarized slice level.

Figure 9:
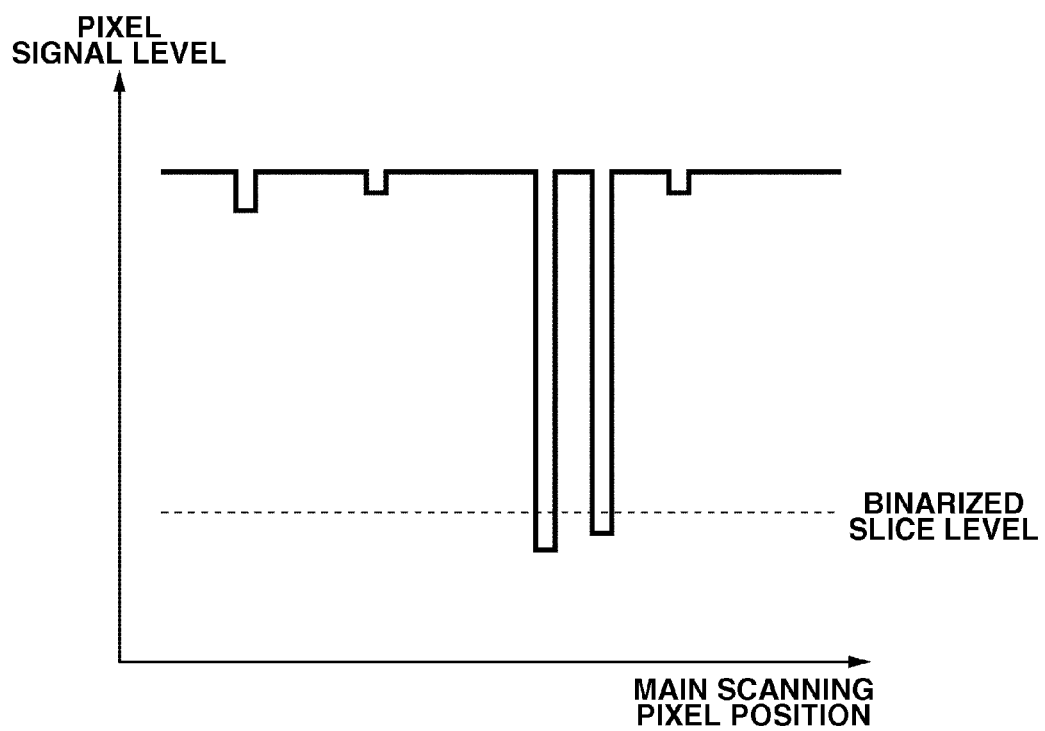
FIG. 9 illustrates a state of binarization in a binarization circuit according to the first exemplary embodiment.

FIG. 9 illustrates a state of binarization according to the signal level (pixel value) in the binarization circuit 2442 according to the first exemplary embodiment. If dust is attached to the white board (reference image) and the image signal is affected, the binarization yields '1' (binarized slice level exceeded) for almost every line in the same position in the main scanning direction.

In synchronization with timing of input of a binarized pixel signal, a synchronization circuit 2443 fetches the pixel signal and data Dk' of a cumulative added value in the same position in the main scanning direction of the pixel signal and outputs both pieces of data to an addition circuit 2444 simultaneously. By repeating this operation for a plurality of lines, a cumulative added value for the number of lines necessary for dust detection processing can be calculated. If dust is present, the cumulative added value for the applicable pixel becomes very large. Next, when the cumulative added value is calculated for the number of lines necessary for dust detection processing, the cumulative added value is output to a comparator 2445.

The addition circuit 2444 adds binarization results for the predetermined number of lines cumulatively for each pixel in the same position in the main scanning direction. For the cumulative addition for a plurality of lines, it is necessary to store the cumulative added value up to the previous line. Thus, the first exemplary embodiment is configured to be able to output the cumulative added value up to now as data Dk from the dust detection unit 2440 to the DMAC 2450. In other words, the DMAC 2450 stores the cumulative added value by writing the data Dk into the specified region of the image memory (RAM 2110) as data Dout.

The specified region refers to a free space of the image memory (RAM 2110) not used when a reading job is started or between sheets (between a plurality of documents being read). The size of the free space dynamically changes depending on usage conditions of the image memory (RAM 2110). For example, a FAX image may be received by the MODEM 2220 from the public line 12 or a print image from the user PC 20 may be received by the LANC 2200 via the LAN 10 simultaneously with a reading job using the document feeder 141. In such cases, the size of the free space decreases.

The cumulative added value up to the previous line stored in the image memory (RAM 2110) is read by the DMAC 2460 as data Din' and input into the dust detection unit 2440 as the data Dk'. The data Dk' input into the dust detection unit 2440 is input into the synchronization circuit 2443.

The comparator 2445 compares a dust determination level (black pixel ratio) and the cumulative added value.

Figure 10:
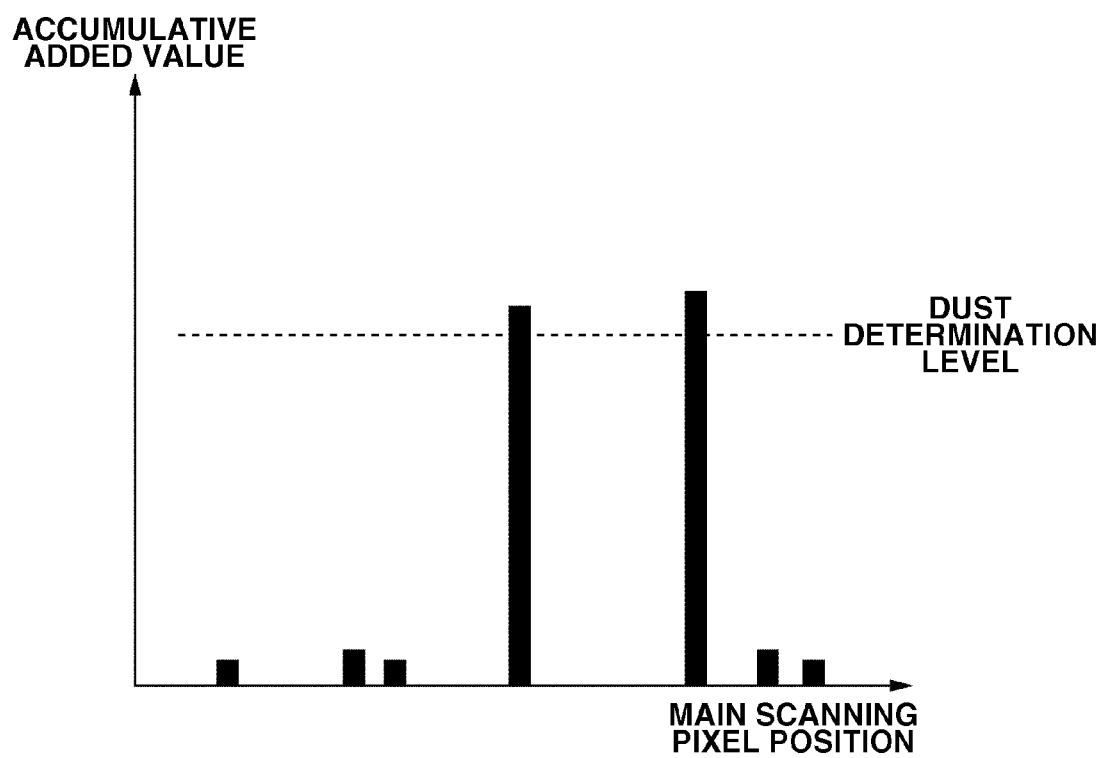
FIG. 10 illustrates the state of comparison of a dust determination level and a cumulative added value by a comparator according to the first exemplary embodiment.

FIG. 10 illustrates the state of comparison of the dust determination level and the cumulative added value by the comparator 2445 according to the first exemplary embodiment. The comparator 2445 temporarily determines a main scanning position for which the cumulative added value exceeds the dust determination level (threshold) as a dust position.

An AND circuit 2446 outputs dust determination results of only an period signal portion of an effective region used for reading document of the reading region to a determination result generation/storage unit 2447 in the subsequent stage by using an effective period signal of the main scanning. The effective period signal of the main scanning is a signal input while a document is actually read and indicates that data input simultaneously with this signal is image data of the document.

The determination result generation/storage unit 2447 generates and stores the dust position information G containing information of the main scanning position and width of dust based on dust determination results input from the AND circuit 2446 and a main scanning pixel position signal input from a main scanning pixel position generation circuit 2448.

The dust position information G is, for example, information indicating two positions where the dust determination level is exceeded in FIG. 10. In other words, the dust position information G is information corresponding to positions indicated by the main scanning pixel position signal input from the main scanning pixel position generation circuit 2448 simultaneously with a determination result of the presence of dust being input from the AND circuit 2446.

The determination result generation/storage unit 2447 may be configured to ignore dust determination result in which a width of dust is equal to or more than (or less than) a certain width or not to store dust determination results in which the number of dust is equal to or more than a certain number. The dust position information G is output from the dust detection unit 2440 and input into the dust correction unit 2420 to be used to determine the correction range (black line portion) when an image with a black line is actually input.

The main scanning pixel position generation circuit 2448 outputs to the determination result generation/storage unit 2447, a main scanning pixel position signal necessary to determine the main scanning position of dust. The main scanning pixel position generation circuit 2448 stores a counter thereinside and generates a main scanning pixel position signal by counting pixels by the counter.

The CPU 2100 may be configured to be able to know a result of dust detection by viewing the dust position information G output from the determination result generation/storage unit 2447 and to set the dust position information G to the dust correction unit 2420.

Determination results by the determination result generation/storage unit 2447 may be stored, like the cumulative added value, in a free space of the image memory (RAM 2110). In that case, the dust position information G will be output to the DMAC 2450.

As described above, dust is detected by analyzing an image read by an automatic document feeder (ADF).

Figure 11:
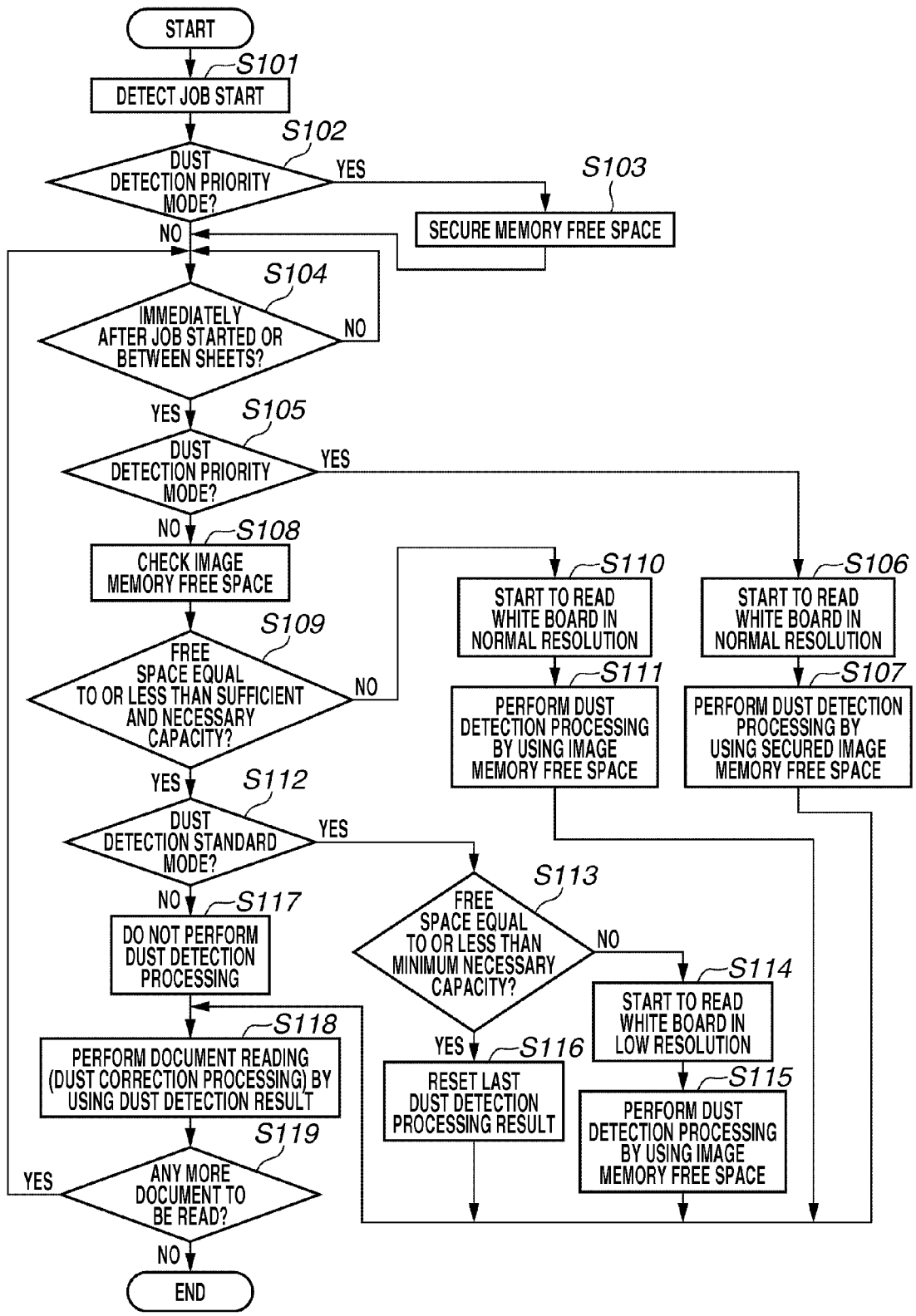
FIG. 11 is a flow chart illustrating dust detection processing and a flow of document reading according to the first exemplary embodiment.

FIG. 11 is a flow chart illustrating dust detection processing and the flow of document reading according to the first exemplary embodiment. The processing illustrated in the flow chart in FIG. 11 can be realized by a program stored in the HDD 2130 being executed by the CPU 2100.

First, in step S101, the start of a document feeding-reading job is detected. The start of the job is detected when a document is set on the tray 142 of the document feeder 141 by the user and a reading start instruction is received by an operation of the operation unit 160.

Figure 12:
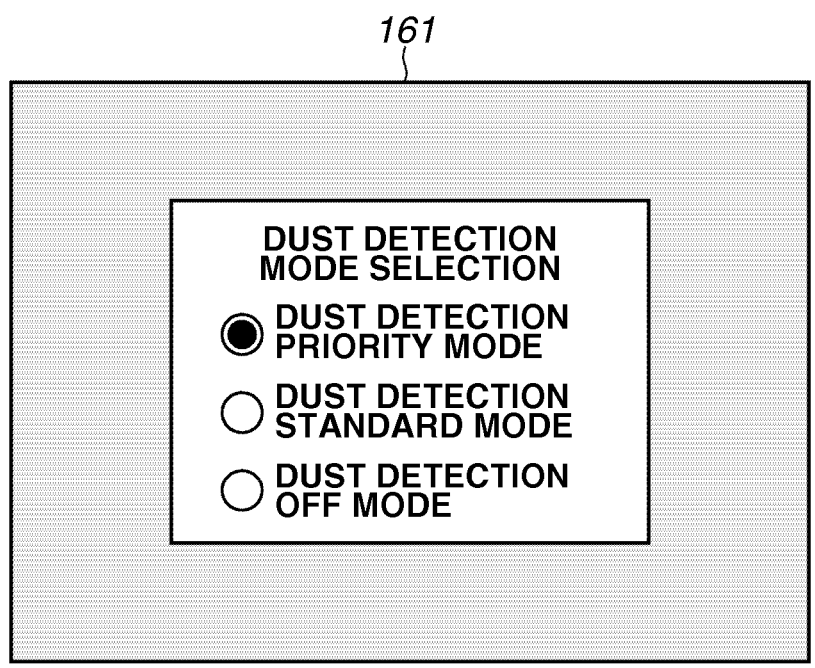
FIG. 12 illustrates a screen displayed when a dust detection mode is selected on a liquid crystal operation panel according to the first exemplary embodiment.

Next, in step S102, it is determined whether the set dust detection mode is the dust detection priority mode. The setting of the dust detection mode may be determined when an instruction from the operation unit 160 is received after a user's operation as illustrated in FIG. 12 or determined by quality of material of the document to be read or the like. If it is determined that the dust detection priority mode is set (YES in step S102), the processing proceeds to step S103. If it is determined that the dust detection priority mode is not set (NO in step S102), the processing proceeds to step S104.

FIG. 12 illustrates a screen displayed on the liquid crystal operation panel 161 when the dust detection mode is selected according to the first exemplary embodiment. The dust detection priority mode, dust detection standard mode, and dust detection OFF mode are displayed as the dust detection modes. FIG. 12 illustrates a case when the dust detection priority mode is selected by a user's operation.

If it is determined that the dust detection priority mode is set (YES in step S102), in step S103, processing for securing a storage area of a memory is performed. By this processing, the storage area of the image memory necessary for dust detection processing is prevented from being used by a competitive operation (other competitive operations such as Fax reception and print job reception). Accordingly, a competitive operation control capacity 2112 is handled in the same manner as an image memory free space 2113, so that dust detection processing can always be performed at 600 dpi. The securing processing of the storage area of the memory in the dust detection priority mode is not limited to the timing in step S103 and may be performed at the timing when the dust detection priority mode is determined or during dust detection processing.

Next, in step S104, it is determined whether now is immediately after the start of the job or between sheets (between a plurality of documents being read). If the processing proceeds to step S104 from step S102 or S103, it is determined that now is immediately after the start of the job. If now is a period in which reading processing of one sheet of the document is completed and before reading processing of the next document is started (return from step S119), it is determined that now is between sheets (between a plurality of documents being read). If it is determined that now is immediately after the start of the job or between sheets (YES in step S104), the processing proceeds to step S105.

Next, in step S105, it is determined whether the set dust detection mode is the dust detection priority mode. The setting of the dust detection mode may be determined when an instruction from the operation unit 160 is received after a user's operation as illustrated in FIG. 12 or determined by quality of material of the document to be read or the like. If it is determined that the dust detection priority mode is set (YES in step S105), the processing proceeds to step S106. If it is determined that the dust detection priority mode is not set (NO in step S105), the processing proceeds to step S108.

If it is determined that the dust detection priority mode is set (YES in step S105), then in step S106, the white board (reference image) is read in normal resolution. The normal resolution is the same resolution as the resolution in which a document is read and refers here to 600 dpi. The white board (reference image) is a white board (reference image) (not illustrated) included in the drive roller 1401. The white board (reference image) is read by the CCD sensor 1407 in a state in which no paper is conveyed before the conveyance of the document 100 is started.

Next, in step S107, dust detection processing is performed using the free space of the image memory (RAM 2110). The free space of the image memory (RAM 2110) used here is the free space secured in step S103.

If, in step S106, reading of the white board (reference image) is started, the pixel signal Dsh obtained by reading of the white board (reference image) is input into the dust detection unit 2440. Then, as illustrated in FIG. 8, dust detection processing is performed by cumulatively adding binarized data for a plurality of lines for each pixel. As described above, the DMAC 2450 stores the cumulative added value by writing the data Dk of the cumulative added value up to the line currently being processed into the specified region of the image memory (RAM 2110) as the data Dout.

In this case, the CPU 2100 sets in advance the free space of the image memory (RAM 2110) secured in step S103 as a writing region address of the DMAC 2450 before the data Dout is written. The address is also set as a read region address of the DMAC 2460. Accordingly, the dust position information G can be obtained.

If it is determined that the dust detection priority mode is not set (NO in step S105), in step S108, the free space of the image memory (RAM 2110) is checked (detected). The free space dynamically changes depending on usage conditions of the image memory (RAM 2110). More specifically, the free space changes according to conditions such as other competitive operations, for example, FAX reception and print job reception.

Next, in step S109, it is determined whether the free space checked in step S108 is equal to or less than a sufficient and necessary capacity (a predetermined value) for dust detection processing. If, for example, the upper limit of reading resolution that can be realized by reading of the scanner unit 140 is 600 dpi, the sufficient and necessary capacity refers to the capacity necessary to store the data Dk of the cumulative added value output from the dust detection unit 2440 in 600-dpi resolution. If, for example, the number of pixels of the sensor is 1024 pixels and cumulative addition is executed by reading eight lines, the sufficient and necessary capacity can be calculated like 1024×3 bits (resolving power: 8)×600/600=384 bytes. The data Dk of the cumulative added value becomes data for the main scanning width and thus, the data amount thereof changes depending on the resolution. If it is determined that the free space is not equal to or less than the sufficient and necessary capacity (NO in step S109), the processing proceeds to step S110. If it is determined that the free space is equal to or less than the sufficient and necessary capacity (YES in step S109), the processing proceeds to step S112.

If it is determined that the free space is not equal to or less than the sufficient and necessary capacity (NO in step S109), then in step S110, like in step S106, the white board (reference image) is read in the normal resolution. The normal resolution is the same resolution as the resolution in which a document is read and refers here to 600 dpi.

Next, in step S111, like in step S107, dust detection processing is performed using the free space of the image memory (RAM 2110). In this case, in contrast to step S107, securing processing of the free space is not performed in step S103. Thus, the free space of the image memory (RAM 2110) that could be checked and secured in step S108 is used for dust detection processing.

In this case, the CPU 2100 sets in advance the free space of the image memory (RAM 2110) that could be checked and secured in step S108 as the writing region address of the DMAC 2450 before the data Dout is written. The address is also set as a read region address of the DMAC 2460. Accordingly, the dust position information G can be obtained.

If it is determined that the free space is equal to or less than the sufficient and necessary capacity (YES in step S109), then in step S112, it is determined whether the dust detection mode is set to the dust detection standard mode. The setting of the dust detection mode may be determined when an instruction from the operation unit 160 is received after a user's operation as illustrated in FIG. 12 or determined by quality of material of the document to be read or the like. If it is determined that the dust detection mode is set to the dust detection standard mode (YES in step S112), the processing proceeds to step S113. If it is determined that the dust detection mode is not set to the dust detection standard mode (NO in step S112), the processing proceeds to step S117.

If it is determined that the dust detection mode is set to the dust detection standard mode (YES in step S112), in step S113, it is determined whether the free space checked in step S108 is equal to or less than a minimum necessary capacity for dust detection processing. If, for example, the lower limit of reading resolution needed when dust correction processing is performed by the dust correction unit 2420 is 100 dpi, the minimum necessary capacity refers to the capacity necessary to store the data Dk of the cumulative added value output from the dust detection unit 2440 in 100-dpi resolution. If, for example, the number of pixels of the sensor is 1024 pixels and cumulative addition is executed by reading eight lines, the minimum necessary capacity can be calculated like 1024×3 bits (resolving power: 8)×100/600=64 bytes. The data Dk of the cumulative added value becomes data for the main scanning width and thus, the data amount thereof changes depending on the resolution. If it is determined that the free space is not equal to or less than the minimum necessary capacity (NO in step S113), the processing proceeds to step S114. If it is determined that the free space is equal to or less than the minimum necessary capacity (YES in step S113), the processing proceeds to step S116.

If it is determined that the free space is not equal to or less than the minimum necessary capacity (NO in step S113), in step S114, in contrast to step S106 or step S110, the white board (reference image) is read in resolution lower than the normal resolution. The resolution is determined so that, based on the free space of the memory checked in step S108, the data Dk of the cumulative added value output from the dust detection unit 2440 can be stored in the free space of the memory in the resolution. If the free space is, for example, 150 bytes, the resolution is set to 300 dpi.

Next, in step S115, dust detection processing is performed using the free space of the image memory (RAM 2110). The dust detection processing is basically similar to the dust detection processing in step S107 or step S111. However, data Vout, which is data of the cumulative added value to be written into the image memory (RAM 2110), is in 300-dpi resolution and the data amount is half the data amount in step S107 or step S111.

If it is determined that the free space is equal to or less than the minimum necessary capacity (YES in step S113), in step S116, dust correction processing is performed using a result of the last dust detection processing. In this way, dust correction processing is performed on a document to be read subsequently using a dust detection processing result before reading the previous document.

If it is determined that the dust detection mode is not set to the dust detection standard mode (NO in step S112), then in step S117, the white board (reference image) is not read and dust detection processing is not performed.

Next, in step S118, a document is read using the document feeder 141. In this processing, if a dust detection result (corresponding to the dust position information G in FIG. 7) has been obtained in step S107, S111, S115, or S116, dust correction processing is also performed. If, in step S117, no dust detection processing is performed, no dust correction processing is performed.

Next, in step S119, it is determined whether to read the subsequent document. This is determined based on whether any document remains on the tray 142 of the document feeder 141. If any document remains on the tray 142 of the document feeder 141 (YES in step S119), it is determined to read the subsequent document. If no document remains on the tray 142 of the document feeder 141 (NO in step S119), it is determined not to read the subsequent document. If it is determined to read the subsequent document (YES in step S119), the processing returns to step S104. If it is determined not to read the subsequent document (NO in step S119), the processing is terminated.

Figure 13:
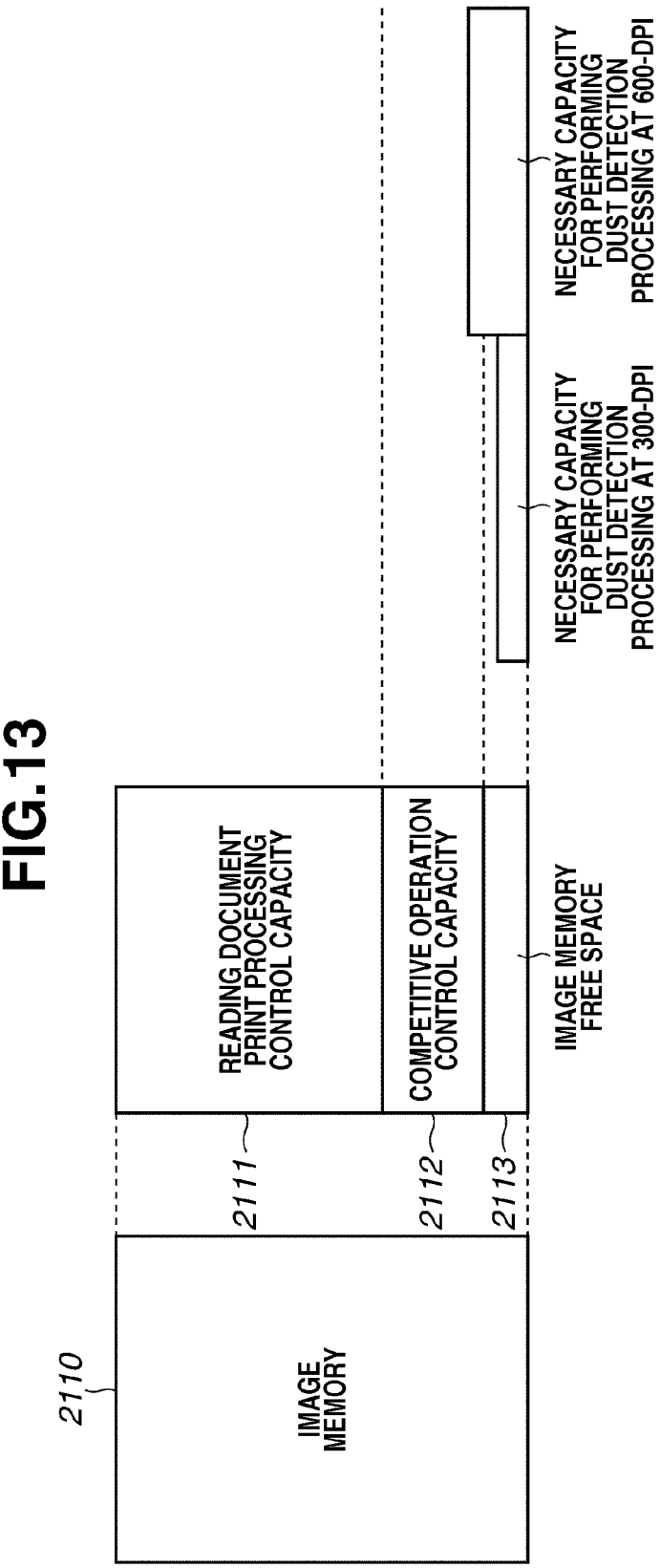
FIG. 13 illustrates how to use a random access memory (RAM) for dust detection processing according to the first exemplary embodiment.

FIG. 13 illustrates how to use the RAM 2110 for dust detection processing according to the first exemplary embodiment.

The internal portion of the image memory is roughly divided into three portions of a reading document print processing control capacity 2111, the competitive operation control capacity 2112, and the image memory free space 2113. The reading document print processing control capacity 2111 indicates a memory capacity necessary to perform image processing on document data whose reading is completed and to produce a print output. The competitive operation control capacity 2112 indicates a memory capacity necessary to perform control or processing of competitive operations such as the FAX reception and the print job reception described above. The image memory free space 2113 indicates a free space of the image memory that is not in use between sheets (between a plurality of documents being read) in a state in which the above processing is being performed.

If dust detection processing is performed between sheets (between a plurality of documents being read), the free space 2113 of the image memory is checked. Then, after the checking, the free space 2113 is compared with the capacity necessary for dust detection processing by the dust detection unit 2440. The capacity necessary for dust detection processing is a capacity necessary to store data such as the above-described cumulative added value.

FIG. 13 illustrates that the free space 2113 of the image memory is a capacity exceeding the necessary capacity to perform dust detection processing at 300 dpi and is a capacity equal to or less than the necessary capacity to perform dust detection processing at 600 dpi. In this case, the CCD sensor 1407 is set to the 300-dpi reading mode and dust detection processing is performed. With the control described above, dust detection processing can be performed in optimal resolution according to the free space of the image memory.

If the dust detection priority mode is set, even if a competitive operation occurs while dust detection processing is performed, steps such as keeping the start of competitive operation processing waiting are taken. In this way, the competitive operation control capacity 2112 is handled in the same manner as the image memory free space 2113, so that dust detection processing can always be performed at 600 dpi. If a competitive operation is already started when the dust detection processing is started in the dust detection priority mode, the free space of the image memory capable of performing dust detection processing at 600 dpi is secured by starting the dust detection processing after the competitive operation is completed.

According to the first exemplary embodiment, processing of dust detection can properly be performed using a free space of the image memory.

Further, according to the first exemplary embodiment, dust detection processing is performed without using a dedicated line memory and therefore, the cost of mounting a dust detection circuit can be reduced and the size of a chip to mount the dust detection circuit can be reduced.

In the first exemplary embodiment, the reading resolution of the white board (reference image) on the drive roller 1401 is changed to fit to the free space of the image memory (RAM 2110) when dust detection processing is performed. In a second exemplary embodiment, however, the white board (reference image) is read in the normal resolution (600 dpi) regardless of the free space of the image memory (RAM 2110) when dust detection processing is performed and then, resolution conversion is performed according to the free space of the image memory (RAM 2110).

In the second exemplary embodiment, an outline configuration of a copying machine, a configuration of a scanner unit, a configuration of an operation unit, and a configuration of a controller are similar to the configurations in the first exemplary embodiment described with reference to FIGS. 1 to 6 and thus, a description thereof will not be repeated.

Figure 14:
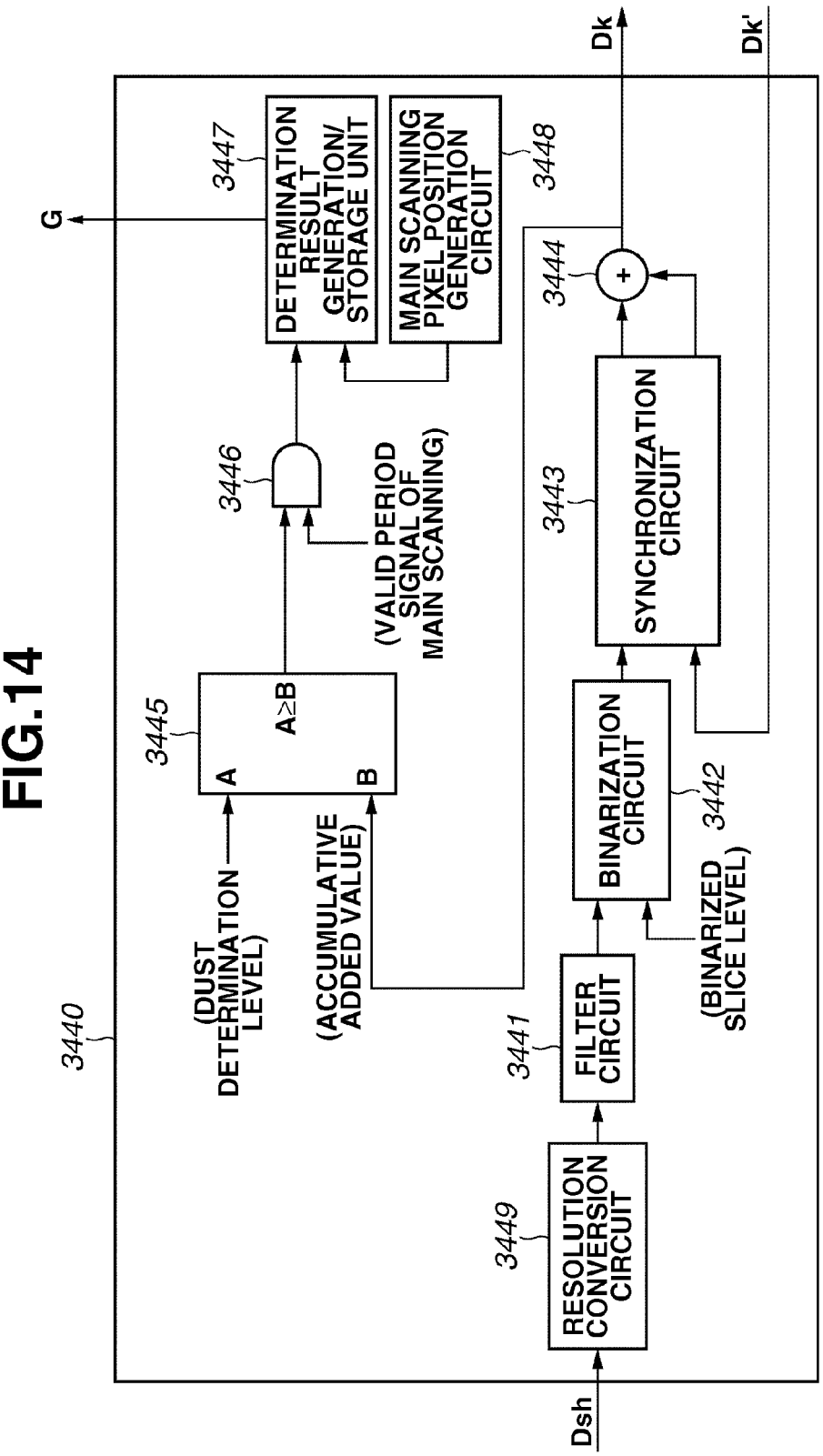
FIG. 14 is a block diagram illustrating a configuration of a dust detection unit according to a second exemplary embodiment.

FIG. 14 is a block diagram illustrating the configuration of the dust detection unit 2440 according to the second exemplary embodiment.

In FIG. 14, configurations of units and circuits 3441 to 3448 are similar to the configurations of the units and circuits 2441 to 2448 illustrated in FIG. 7, respectively and thus, a description thereof will not be repeated.

A resolution conversion circuit 3449 performs resolution conversion processing on the image signal Dsh after shading corrections. The resolution conversion processing is basically performed in a direction in which the resolution is lowered. A pixel signal is input into the filter circuit 3441 after resolution conversion processing being performed thereon by the resolution conversion circuit 3449. If no resolution conversion is needed, the pixel signal is input into the filter circuit 3441 without the resolution conversion processing being performed thereon by the resolution conversion circuit 3449.

Figure 15:
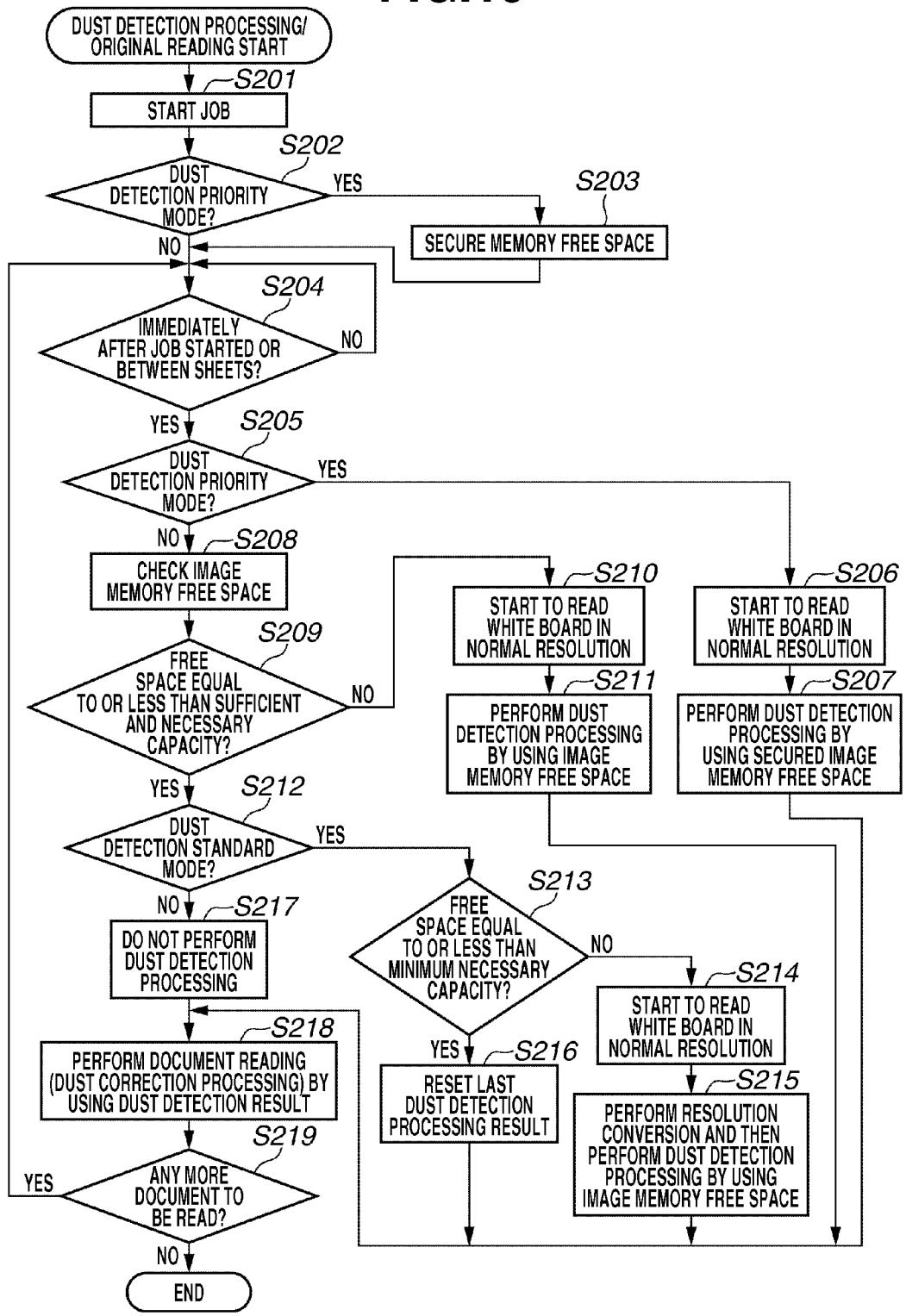
FIG. 15 is a flow chart illustrating dust detection processing and a flow of document reading according to the second exemplary embodiment.
Figure 16:
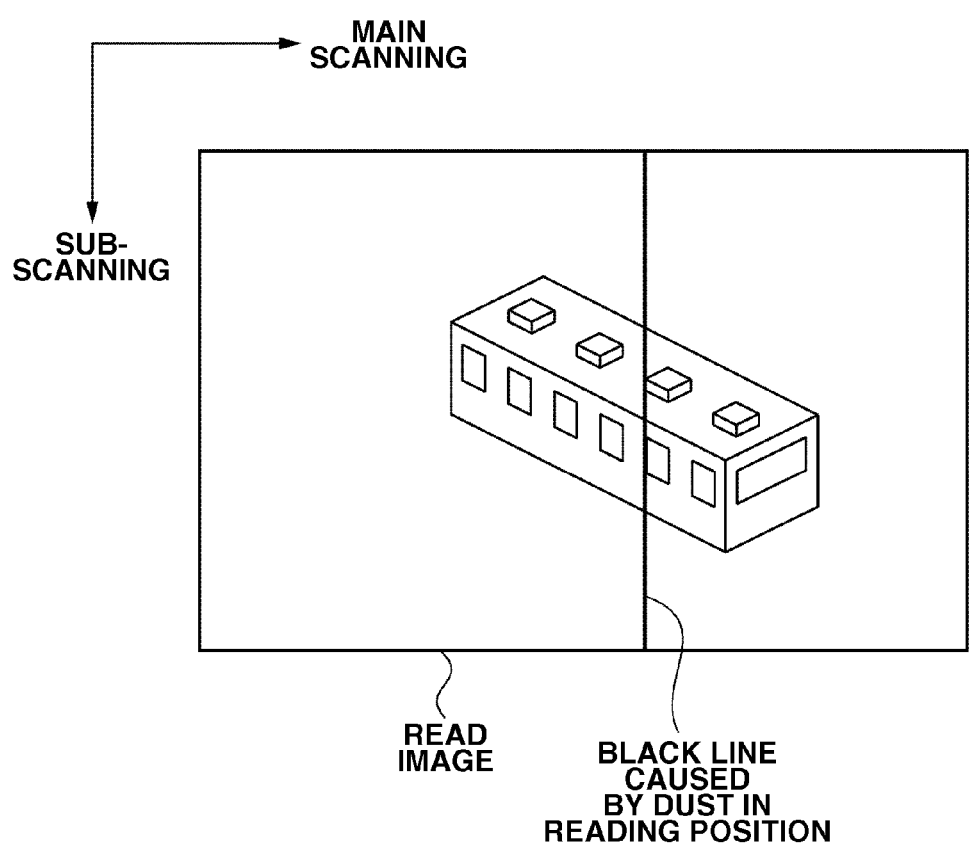
FIG. 16 illustrates an image in which a black line appears due to dust when a document is read by a scanner using document feeding-reading.

FIG. 15 is a flow chart illustrating the dust detection processing and the flow of document reading according to the second exemplary embodiment. The processing illustrated in the flow chart in FIG. 15 can be realized by a program stored in the HDD 2130 being executed by the CPU 2100.

In FIG. 15, configurations of steps S201 to S213 and steps 216 to S219 are similar to the configurations of steps S101 to S113 and steps S116 to S119 in FIG. 11, respectively and thus, a description thereof will not be repeated.

If, in step S213, it is determined that the free space is not equal to or less than the minimum necessary capacity (NO in step S213), then in step S214, the white board (reference image) is read in the normal resolution.

Next, in step S215, resolution conversion of the pixel signal read in step S214 is performed by the resolution conversion circuit 3449, and then dust detection processing is performed using the free space of the image memory (RAM 2110). The resolution is determined so that, based on the free space of the memory checked in step S208, the data Dk of the cumulative added value output from the dust detection unit 2440 can be stored in the free space of the memory in the resolution. Also, the resolution is determined so that, based on the processing capability of the dust correction unit 2420, the data Dk of the cumulative added value output from the dust detection unit 2440 can be processed by the dust correction unit 2420 in the resolution.

For example, a pixel signal read at 600 dpi is converted into 300 dpi. The dust detection processing is different in that the data Vout, which is data of the cumulative added value to be written into the image memory (RAM 2110), is in 300-dpi resolution and the data amount is half the data amount in step S207 or step S211.

According to the second exemplary embodiment, processing of dust detection can properly be performed using a free space of the image memory.

Further, according to the second exemplary embodiment, dust detection processing is performed without using a dedicated line memory and therefore, the cost of mounting a dust detection circuit can be reduced and the size of a chip to mount the dust detection circuit can be reduced.

Furthermore, according to the second exemplary embodiment, a reference image is read by the scanner unit in the same resolution and the resolution of the read reference image is converted according to the free space of the image memory and therefore, the control of the scanner unit for dust detection can be made easier.

Aspects of the present invention can also be realized by a computer of a system or apparatus (or devices such as a CPU or a micro processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-244364 filed Oct. 29, 2010, which is hereby incorporated by reference herein in its entirety.

What is claimed is:

1. An image processing apparatus comprising:
a storage unit;
a reading unit configured to read an image of a document line by line in a main scanning direction;
a detection unit configured to detect a position of a portion of the image in the main scanning direction of the reading unit where the image cannot be read correctly, by using a free space of the storage unit;
a correction unit configured to correct a pixel value of the portion corresponding to the position detected by the detection unit in the image read by the reading unit;
a check unit configured to check size of the free space of the storage unit; and
a control unit configured to control the detection unit to detect the position in first resolution, if the size of the free space checked by the check unit is larger than a predetermined value and control the detection unit to detect the position in second resolution which is lower than the first resolution, if the size of the free space checked by the check unit is smaller than the predetermined value.

2. The image processing apparatus according to claim 1, wherein the reading unit reads a reference image while the document is not being conveyed and
the detection unit detects the position by analyzing the reference image.

3. The image processing apparatus according to claim 2, wherein the detection unit accumulates in a sub-scanning direction a number of black pixels contained in the reference image in each position in the main scanning direction to detect a position where a cumulative value of the number of black pixels is larger than a threshold.

4. The image processing apparatus according to claim 3, wherein the predetermined value is a data amount of an image read by the reading unit in the first resolution for predetermined lines.

5. The image processing apparatus according to claim 3, wherein if a pixel value of a pixel is lower than a predetermined level, the detection unit determines that the pixel is the black pixel.

6. The image processing apparatus according to claim 1, wherein the first resolution is an upper limit of image reading resolution for the reading unit.

7. The image processing apparatus according to claim 1, further comprising a securing unit configured to secure a storage area larger than the predetermined value in the storage unit,
wherein if the securing unit secures the storage area larger than the predetermined value, the control unit controls the detection unit to detect the position in the first resolution.

8. The image processing apparatus according to claim 1, wherein if the size of the free space checked by the check unit is larger than a data amount of an image which is read by the reading unit in the second resolution, the control unit controls the detection unit not to detect the position.

9. The image processing apparatus according to claim 1, wherein if the size of the free space checked by the check unit is smaller than the predetermined amount, the control unit controls the reading unit to read the reference image in the second resolution.

10. The image processing apparatus according to claim 1, wherein if the size of the free space checked by the check unit is smaller than the predetermined amount, the control unit controls the reading unit to read the reference image in the first resolution and controls the detection unit to detect the position by converting resolution of the reference image from the first resolution into the second resolution.

11. A method for controlling an image processing apparatus including a storage unit and a reading unit configured to read an image of a document line by line in a main scanning direction, the method comprising:

detecting a position of a portion of the image in the main scanning direction of the reading unit where the image cannot be read correctly, by using a free space of the storage unit;

correcting a pixel value of the portion corresponding to the detected position in the image read by the reading unit;

checking size of the free space of the storage unit; and controlling the position to be detected in first resolution, if the size of the checked free space is larger than a predetermined value and controlling the position to be detected in second resolution which is lower than the first resolution, if the size of the checked free space is smaller than the predetermined value.

12. A non-transitory storage medium storing a program causing an image processing apparatus including a storage unit and a reading unit configured to read an image of a document line by line in a main scanning direction to perform:

detecting a position of a portion of the image in the main scanning direction of the reading unit where the image cannot be read correctly, by using a free space of the storage unit;

correcting a pixel value of the portion corresponding to the detected position in the image read by the reading unit;

checking size of the free space of the storage unit; and controlling the position to be detected in first resolution, if the size of the checked free space is larger than a predetermined value and controlling the position to be detected in second resolution which is lower than the first resolution, if the size of the checked free space is smaller than the predetermined value.

\* \* \* \* \*